(No Model.)

G. W. MILLS.
PHOTOGRAPHIC SHUTTER.

No. 581,297. Patented Apr. 27, 1897.

Witnesses
Wm. W. Rheem
Wm. O. Belt

Inventor
George W. Mills
by Raymund & Omohundro
Atty's

UNITED STATES PATENT OFFICE.

GEORGE W. MILLS, OF NEW YORK, N. Y.

PHOTOGRAPHIC SHUTTER.

SPECIFICATION forming part of Letters Patent No. 581,297, dated April 27, 1897.

Application filed May 27, 1896. Serial No. 593,307. (No model.)

*To all whom it may concern:*

Be it known that I, GEORGE W. MILLS, a citizen of the United States, residing at New York, in the county of New York and State of New York, have invented certain new and useful Improvements in Photographic Shutters, of which the following is a full, clear, and exact description, reference being had to the accompanying drawings, forming a part of this specification.

My invention relates to certain new and useful improvements in shutters for cameras; and it has for its object to provide a simple and effective shutter which can be easily operated for instantaneous or time exposures.

A further object of the invention is to provide operative devices for the shutter which will indicate the position of the shutter and which can be employed to govern its movement.

With these and other ends in view the invention consists in the peculiar construction and arrangement of parts hereinafter described, and illustrated in the accompanying drawings, referring to which—

Figure 1:
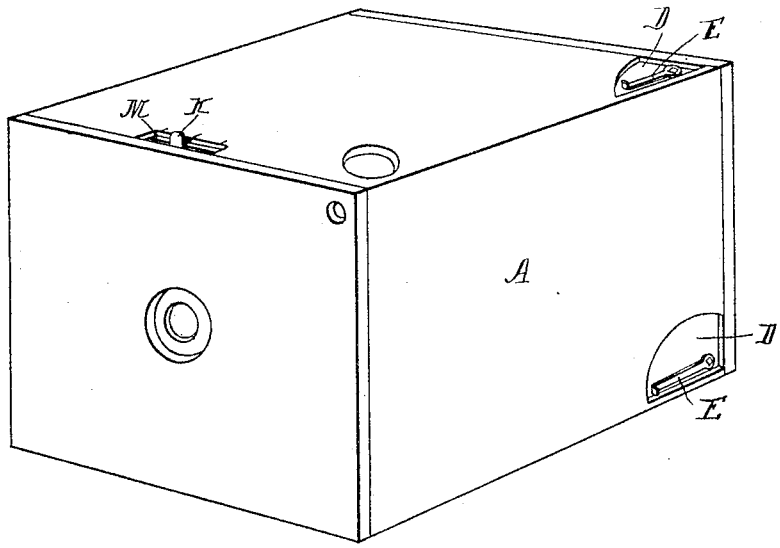
Figure 2:
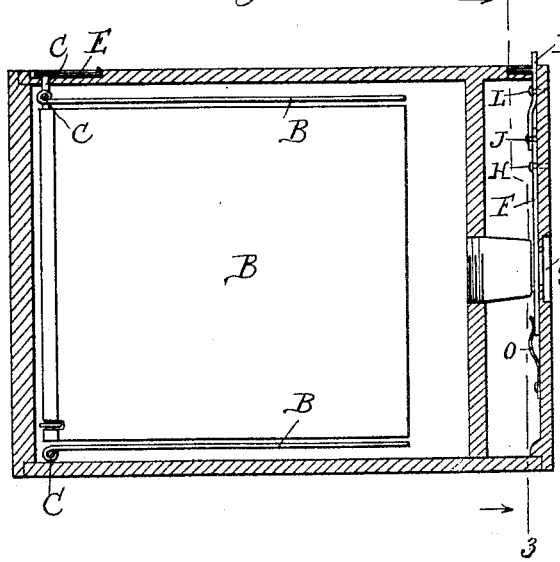
Figure 3:
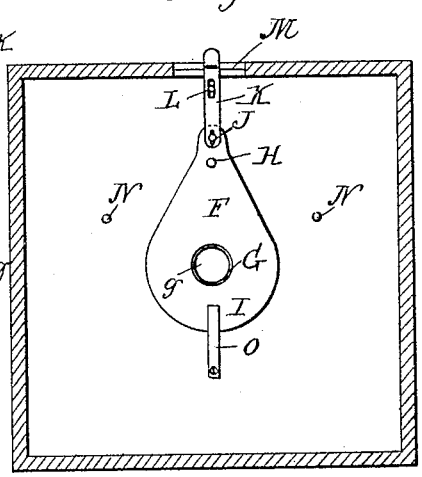

Figure 1 is a perspective view of a camera of simple type embodying my improvements. Fig. 2 is a sectional view showing the shutter mechanism in full lines. Fig. 3 is a sectional view on the line 3 3 of Fig. 2, looking in the direction indicated by the arrows.

I have shown in the drawings a camera which comprises a suitable box A and four plate-holders B, three of which are seen in Fig. 2. The plate-holders are secured on pivot-pins C, these pins being supported on the inner sides of the box, at or near the rear end thereof, substantially in the manner shown in Fig. 2. The pivot-pins project at one end through the side of the box into recesses D, formed in the outer faces of the sides. These recesses are of such a form and shape as will accommodate the crank-arms E, which are secured on the projecting ends of the pivot-pins and are adapted to be moved around in the arc of a circle in said recesses, the sides of the box being provided with these recesses, so that the crank-arms E will be below the plane of the outer surface of the side and therefore to a certain extent protected.

When it is desired to bring the plate-holder into operative position, the proper crank-arm is turned to operate the pivot-pin. It will therefore be observed that the position of the crank-arm in the recess will indicate whether the plate-holder is in operative position or is in its normal inoperative position adjacent to the side of the box. If desired, suitable words or characters may be placed upon the sides of the box adjacent to the recesses, so that the arms will operate as indicators pointing to the proper character, which will tell the position of the plate-holder in the box.

The shutter F is provided with an opening G and is pivotally secured on a pin H at the front of the box, the opening G being arranged to register with an opening $g$ in the front of the box. This shutter may be of any desired form or size, but it is preferably provided with an enlarged rounded lower portion I and a narrow extension J above the pivot-pin H. A lever K is pivotally secured to the extension J, and this lever is pivoted on a pin L and projects up through an opening M in the top of the box, so that its end will extend above the top of the box, where it can be manipulated to adjust the shutter in the proper manner.

When it is desired to operate the shutter, the lever is moved from the outside of the box and from side to side, so that the shutter will be reciprocated back and forth in the usual manner, the operation being governed by the character of the exposure desired. Pins N are located within the box to limit the sidewise movement of the shutter, and a flat spring O is secured on the front of the box and arranged to bear upon the lower rounded portion of the shutter for the purpose of holding the shutter in the position to which it has been thrown by the operation of the lever.

Suitable marks or characters may be arranged adjacent to the opening M in the top of the box for the purpose of designating the position of the shutter, the top of the lever acting as an indicator for this purpose.

It will be observed that an instantaneous exposure may be given with very little effort, as the operation of the lever is quick and positive, while, on the other hand, a time exposure can be secured by bringing the lever to the position indicated in Fig. 3 and allowing it to remain there for the desired length of time. When the lever is thrown to one side or the other, the opening *g* is closed, and the spring O will hold the shutter in this position until the lever is again operated, the spring bearing upon the shutter at all times and serving to hold the shutter in whatever position it may be brought by the operation of the lever.

The box containing the operating mechanism of the camera may be of any desired form and size, and I have herein referred to the same as having four sides and two ends, the plate-holders being normally arranged adjacent to the said four sides of the box, respectively, although it will be understood that the side through which the lever projects in the manner described is virtually the top of the box and the camera is held when in use so that that side will be uppermost.

Having thus fully described my invention, what I claim, and desire to secure by Letters Patent, is—

In a camera, the combination with a box having an opening in the front thereof, of a shutter pivotally secured within the box and on the front thereof, said shutter having an enlarged rounded lower portion and an extension above the pivot, a lever pivotally secured on the front of the box above the shutter, the pivot of said lever being in vertical alinement with the pivot of the shutter, said lever being pivotally connected at its lower end with the extension on the shutter and having its upper end projecting above the top of the box through an opening therein, the pins N adapted to limit the sidewise movement of the shutter, and a flat spring secured beneath the shutter and bearing on the enlarged lower portion thereof to maintain the shutter in whatever position it is adjusted, substantially as described.

GEORGE W. MILLS.

Witnesses:
JOHN A. JOHNSTON,
FRANKLIN B. WARNER.